United States Patent
Hofler et al.

(10) Patent No.: US 8,491,443 B2
(45) Date of Patent: Jul. 23, 2013

(54) METHOD FOR CONTROLLING A LOCK-UP CLUTCH OF A HYDRODYNAMIC TORQUE CONVERTER

(75) Inventors: Hans Hofler, Immenstaad (DE); Thomas Kurz, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 255 days.

(21) Appl. No.: 13/124,843

(22) PCT Filed: Sep. 29, 2009

(86) PCT No.: PCT/EP2009/062592
§ 371 (c)(1),
(2), (4) Date: Apr. 19, 2011

(87) PCT Pub. No.: WO2010/046204
PCT Pub. Date: Apr. 29, 2010

(65) Prior Publication Data
US 2011/0197696 A1    Aug. 18, 2011

(30) Foreign Application Priority Data
Oct. 23, 2008    (DE) .......................... 10 2008 043 110

(51) Int. Cl.
*B60W 10/00*    (2006.01)
*F16H 61/48*    (2006.01)
(52) U.S. Cl.
USPC .................................. 477/79; 477/57; 477/85

(58) Field of Classification Search
USPC ................. 477/54, 5, 57, 79, 80, 84, 85, 174, 477/180
See application file for complete search history.

(56) References Cited

U.S. PATENT DOCUMENTS

| | | |
|---|---|---|
| 3,985,046 A | 10/1976 | Morris et al. |
| 4,246,997 A | 1/1981 | Tarumizu |
| 4,640,394 A | 2/1987 | Higashi et al. |
| 4,819,777 A | 4/1989 | Yasue et al. |
| 4,835,694 A | 5/1989 | Yamamoto et al. |
| 5,509,520 A | 4/1996 | Evans et al. |
| 5,562,571 A | 10/1996 | Maruyama et al. |
| 5,573,473 A | 11/1996 | Asayama et al. |
| 5,621,643 A | 4/1997 | Nakagami et al. |
| 5,681,238 A | 10/1997 | Minowa et al. |
| 5,720,358 A | 2/1998 | Christensen et al. |
| 5,976,055 A | 11/1999 | Sasaki |
| 6,017,290 A | 1/2000 | Kinoshita et al. |
| 6,039,675 A * | 3/2000 | Adachi et al. ................. 477/174 |
| 6,042,507 A | 3/2000 | Genise et al. |
| 6,099,435 A | 8/2000 | Halene et al. |
| 6,181,020 B1 | 1/2001 | Uchida et al. |
| 6,234,254 B1 | 5/2001 | Dietz et al. |
| 6,306,061 B1 | 10/2001 | Inamura et al. |

(Continued)

FOREIGN PATENT DOCUMENTS

| DE | 33 47 256 A1 | 7/1985 |
|---|---|---|
| DE | 35 17 381 A1 | 11/1985 |

(Continued)

*Primary Examiner* — Roger Pang
(74) *Attorney, Agent, or Firm* — Davis & Bujold, PLLC

(57) ABSTRACT

A lock-up clutch of a hydrodynamic torque converter remains disengaged during shifts of a downstream transmission, when the drive motor is operated in the partial load range, and remains engaged during shifts of the downstream transmission, when drive motor is operated in a full load range.

3 Claims, 1 Drawing Sheet

U.S. PATENT DOCUMENTS

| | | |
|---|---|---|
| 6,314,357 B1 | 11/2001 | Kon et al. |
| 6,615,963 B2 | 9/2003 | Ono et al. |
| 6,648,795 B2 * | 11/2003 | Kobayashi ............... 477/54 |
| 6,679,806 B2 * | 1/2004 | Ayo et al. ............... 477/54 |
| 6,846,265 B2 * | 1/2005 | Yamamoto et al. ........ 477/3 |
| 6,997,851 B2 | 2/2006 | Hofler |
| 7,778,757 B2 | 8/2010 | Brattberg |
| 2004/0188168 A1 | 9/2004 | Aumann |
| 2004/0192505 A1 | 9/2004 | Leber et al. |
| 2007/0149354 A1 | 6/2007 | Ota et al. |
| 2007/0213175 A1 * | 9/2007 | Kuwahara et al. ........ 477/62 |
| 2008/0234906 A1 | 9/2008 | Warner |
| 2008/0242502 A1 | 10/2008 | Lin |
| 2009/0054206 A1 | 2/2009 | Tamba et al. |

FOREIGN PATENT DOCUMENTS

| | | |
|---|---|---|
| DE | 36 26 100 A1 | 2/1987 |
| DE | 37 12 498 A1 | 10/1987 |
| DE | 40 30 811 A1 | 4/1992 |
| DE | 44 27 359 A1 | 2/1995 |
| DE | 44 07 951 A1 | 9/1995 |
| DE | 195 21 458 A1 | 12/1995 |
| DE | 196 36 629 A1 | 3/1997 |
| DE | 198 20 047 A1 | 11/1998 |
| DE | 199 10 049 A1 | 9/1999 |
| DE | 199 25 414 A1 | 12/1999 |
| DE | 698 06 837 T2 | 4/2003 |
| DE | 698 20 922 T2 | 6/2004 |
| DE | 103 14 327 A1 | 10/2004 |
| DE | 103 14 334 A1 | 10/2004 |
| DE | 103 14 337 A1 | 10/2004 |
| DE | 600 08 957 T2 | 1/2005 |
| DE | 103 56 194 A1 | 7/2005 |
| DE | 60 2004 013 201 T2 | 7/2009 |
| EP | 0 907 043 A1 | 4/1999 |
| EP | 1 188 960 A2 | 3/2002 |
| EP | 1 801 294 A1 | 6/2007 |
| FR | 2 557 518 A1 | 7/1985 |
| WO | 2006/011832 A1 | 2/2006 |
| WO | 2006/017902 A1 | 2/2006 |

* cited by examiner

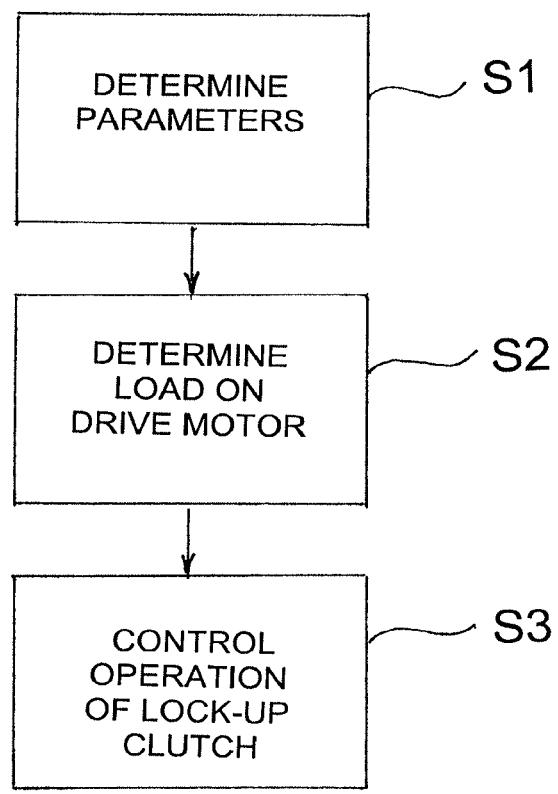

METHOD FOR CONTROLLING A LOCK-UP CLUTCH OF A HYDRODYNAMIC TORQUE CONVERTER

This application is a National Stage completion of PCT/EP2009/062592 filed Sep. 29, 2009, which claims priority from German patent application serial no. 10 2008 043 110.9 filed Oct. 23, 2008.

FIELD OF THE INVENTION

The invention relates to a method for controlling a lock-up clutch of a hydrodynamic torque converter.

BACKGROUND OF THE INVENTION

Lock-up clutches, in hydrodynamic torque converters, are used to directly connect the input shaft of the hydrodynamic torque converter to its output shaft, which creates a direct throughdrive of the drive motor to the downstream transmission and can improve the efficiency of the overall system.

DE 4030811 A1 discloses a method for controlling a lock-up clutch of a hydrodynamic torque converter that is controlled to bring the lock-up clutch into a state of slippage depending on the change of the engine load, wherein a specific degree of slippage is set.

SUMMARY OF THE INVENTION

The object of the present invention is to create a method for controlling a lock-up clutch, of a hydrodynamic torque converter, in which the driving behavior of the vehicle, especially a working machine such as a wheel loader, is further improved.

BRIEF DESCRIPTION OF THE DRAWING

Below, the invention is explained in greater detail with reference to the drawing. The sole drawing shows a flowchart illustrating steps of the method according to the invention.

DETAILED DESCRIPTION OF THE PREFERRED EMBODIMENTS

According to the invention and with reference to the figure, the engaged gear of the transmission, the drive torque of the transmission and the turbine speed of the hydrodynamic torque converter are determined S1 determining the load at which the drive motor is operating S2 from at least these parameters and, depending on these parameters, the lock-up clutch is actuated for engagement S3. When the drive motor, for example an internal combustion engine, is operated under a full load, the lock-up clutch of the hydrodynamic torque converter is actuated for engagement when the torque of the turbine wheel of the hydrodynamic torque converter is the same when the lock-up clutch is engaged and disengaged. The lock-up clutch is thereby engaged, before upshifting to the next gear occurs, and is hence actuated for engagement during this shifting process and, when downshifting to the next gear occurs, the lock-up clutch also remains engaged.

When the drive motor is operated under a partial load, the lock-up clutch only engages once the speed of the turbine wheel is significantly higher which causes shifting to occur in the partial load range of the drive motor when the lock-up clutch is actuated for disengagement. Shifting to the next highest or lowest gear, when the drive motor is in the partial load range, hence occurs when the lock-up clutch is disengaged. The lock-up clutch engages, after the shifting process to the next highest gear, when the defined conditions for engagement exist.

If the shifting points, for actuating the lock-up clutch, are exclusively determined from the difference between the rotational speed of the turbine wheel and the impeller of the hydrodynamic torque converter, the driving behavior changes significantly in the lower gears, especially with a working machine such as a wheel loader at speeds in the range of 12 km/h, from the driving behavior when the vehicle is operated in the higher gears.

By means of the method according to the invention, the driving behavior is adapted, when the working machine is operated at lower gears, to the driving behavior when the working machine is operated at higher gears.

In a further embodiment according to the invention, there is a separate characteristic for each gear to set the switching thresholds at which the transmission input torque and the turbine rotational speed are defined in order to set the optimum shifting points for engaging the lock-up clutch in each gear.

The invention claimed is:

1. A method of controlling a lock-up clutch of a hydrodynamic torque converter having a turbine wheel which connects a drive motor to a transmission having at least two shiftable gears, the lock-up clutch being actuated for engagement to thereby directly connecting an input shaft of the hydrodynamic torque converter to an output shaft of the hydrodynamic torque converter, and being actuated for disengagement to thereby disconnect the direct connection, a turbine rotational speed, a drive torque of the transmission and an engaged gear being determined, and the lock-up clutch being actuated for engagement depending on the drive torque of the transmission, the turbine rotational speed and the engaged gear of the transmission and thereby directly connecting the input shaft to the output shaft of the hydrodynamic torque converter, the method comprising the steps of:
    when the drive motor is operating under a full load, engaging the lock-up clutch and thereby directly connecting the input shaft of the hydrodynamic torque converter to the output shaft when the torque of the turbine wheel is substantially the same as when the lock-up clutch is actuated for engagement and disengagement, and
    when the drive motor is operating in a partial load range, engaging the lock-up clutch only when the turbine rotational speed is higher than the turbine rotational speed at which the lock-up clutch is engaged when the drive motor is under the full load, and disengaging the lock-up clutch, when the transmission shifts to a different gear, while the drive motor is operated in the partial load range, and engaging the lock-up clutch when the transmission shifts to a different gear while the drive motor is operated in the full load range.

2. The method of controlling a lock-up clutch according to claim 1, further comprising the step of providing the transmission with more than two gears, and defining a torque of the transmission and a turbine rotational speed, for each gear of the transmission, at which the lock-up clutch is actuated for engagement.

3. The method of controlling a lock-up clutch according to claim 1, further comprising the step of, when the drive motor is operating under the full load, actuating the lock-up clutch for engagement when the torque of the turbine wheel is substantially the same as when the lock-up clutch is actuated for engagement and disengagement.

* * * * *